(12) United States Patent
Louie et al.

(10) Patent No.: US 12,231,469 B2
(45) Date of Patent: *Feb. 18, 2025

(54) SECURITY OPERATION SELECTION USING MACHINE-LEARNED MODEL IN DOCUMENT MANAGEMENT SYSTEM

(71) Applicant: DocuSign, Inc., San Francisco, CA (US)

(72) Inventors: Darren Hon Kit Louie, Seattle, WA (US); Blake Thomas Walsh, Seattle, WA (US); Reid B. Maker, Issaquah, WA (US); Mark Groves, Seattle, WA (US); Anunay Kumar, Redmond, WA (US); Michael Elliot Brickman, Seattle, WA (US); Joshua D. Wise, Seattle, WA (US)

(73) Assignee: Docusign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,270

(22) Filed: Nov. 30, 2023

(65) Prior Publication Data
US 2024/0114058 A1  Apr. 4, 2024

Related U.S. Application Data

(63) Continuation of application No. 17/246,529, filed on Apr. 30, 2021, now Pat. No. 11,870,813.

(51) Int. Cl.
*H04L 9/40* (2022.01)
*G06F 21/62* (2013.01)
*G06N 20/00* (2019.01)

(52) U.S. Cl.
CPC .......... *H04L 63/20* (2013.01); *G06F 21/6209* (2013.01); *G06N 20/00* (2019.01)

(58) Field of Classification Search
CPC ...... H04L 63/20; G06F 21/6209; G06N 20/00
See application file for complete search history.

(56) References Cited

U.S. PATENT DOCUMENTS

| 8,655,961 B2 | 2/2014 | McCabe et al. |
| 8,949,706 B2 | 2/2015 | McCabe et al. |
| (Continued) | | |

FOREIGN PATENT DOCUMENTS

| WO | 2022033699 A1 | 2/2022 |

OTHER PUBLICATIONS

Notice of Allowance from U.S. Appl. No. 17/246,529 dated Aug. 28, 2023, 17 pp.

(Continued)

*Primary Examiner* — John B King
(74) *Attorney, Agent, or Firm* — Shumaker & Sieffert, P.A.

(57) ABSTRACT

A system and a method are disclosed for providing recommendations for sets of security operations for improving security of documents created or executed within an online document system. A supplier entity may select sets of security operations to be performed for a request provided to a signing entity. The online document system computes an aggregate measure of security for the selected sets of security operations and compares it to a threshold measure of security. If the aggregate measure is less than the threshold measure, the online document system uses a machine-learned model to identify additional sets of security operations that when added, results in an updated aggregate measure of security greater than the threshold. The additional sets of security operations are presented to the supplier entity for inclusion within a security operation workflow in combination with the selected sets of security operations.

20 Claims, 5 Drawing Sheets

(56) References Cited

U.S. PATENT DOCUMENTS

| | | | |
|---|---|---|---|
| 9,628,506 | B1 | 4/2017 | Han et al. |
| 9,634,975 | B2 | 4/2017 | McCabe et al. |
| 10,198,418 | B2 | 2/2019 | McCabe et al. |
| 10,237,298 | B1 | 3/2019 | Nguyen et al. |
| 10,783,262 | B2 | 9/2020 | Goyal et al. |
| 11,080,336 | B2* | 8/2021 | Van Dusen ............ G06Q 10/10 |
| 11,870,813 | B2 | 1/2024 | Louie et al. |
| 2004/0186852 | A1 | 9/2004 | Rosen |
| 2016/0080345 | A1 | 3/2016 | Safruti |
| 2017/0251007 | A1 | 8/2017 | Fujisawa |
| 2017/0270432 | A1* | 9/2017 | Sachdev ............. G06Q 10/067 |
| 2018/0121844 | A1* | 5/2018 | Alwine ................ G06F 21/577 |
| 2019/0205317 | A1 | 7/2019 | Tobias |
| 2019/0258807 | A1 | 8/2019 | DiMaggio |
| 2020/0027022 | A1* | 1/2020 | Jha ........................... G06N 3/08 |
| 2020/0081698 | A1 | 3/2020 | Mansukhani |
| 2020/0220885 | A1 | 7/2020 | Will |
| 2020/0274902 | A1 | 8/2020 | Go pal |
| 2021/0027602 | A1 | 1/2021 | Correnti |
| 2021/0105251 | A1 | 4/2021 | Baldwin |
| 2021/0367954 | A1 | 11/2021 | Daga |
| 2021/0406708 | A1 | 12/2021 | Renckert |
| 2022/0038410 | A1* | 2/2022 | Bhargava ............. H04L 51/046 |
| 2022/0053011 | A1 | 2/2022 | Rao |
| 2022/0103589 | A1* | 3/2022 | Shen ................. G06Q 10/0635 |
| 2022/0222089 | A1* | 7/2022 | Joshi ..................... G06F 16/953 |
| 2022/0321647 | A1 | 10/2022 | Berggren |
| 2023/0244689 | A1 | 8/2023 | Hanby, IV |
| 2023/0308465 | A1* | 9/2023 | Alroobaea ............ H04L 63/205 |
| 2023/0344840 | A1* | 10/2023 | Doleh ................ H04L 63/1408 |
| 2024/0250953 | A1* | 7/2024 | Robison ................ H04L 63/105 |

OTHER PUBLICATIONS

U.S. Appl. No. 16/229,126, filed Dec. 21, 2018, naming inventors McCabe et al.

U.S. Appl. No. 17/077,551, filed Oct. 22, 2022, naming inventors McCabe et al.

* cited by examiner

500

```
┌─────────────────────────────────────────────────────────────┐
│ Present, to a user, a plurality of sets of security        │
│ operations within a security policy customization interface │
│                          510                                │
└─────────────────────────────────────────────────────────────┘
                             │
                             ▼
┌─────────────────────────────────────────────────────────────┐
│         Receive a selection of sets of security operations  │
│                          520                                │
└─────────────────────────────────────────────────────────────┘
                             │
                             ▼
┌─────────────────────────────────────────────────────────────┐
│ Compute an aggregate measure of security based on the       │
│ measures of security associated with the selected sets of   │
│ security operations                                         │
│                          530                                │
└─────────────────────────────────────────────────────────────┘
                             │
                             ▼
┌─────────────────────────────────────────────────────────────┐
│ In response to the aggregate measure of security being less │
│ than a threshold measure of security, applying a            │
│ machine-learned model to characteristics of the user to     │
│ identify additional sets of security operations to recommend│
│                          540                                │
└─────────────────────────────────────────────────────────────┘
                             │
                             ▼
┌─────────────────────────────────────────────────────────────┐
│ Modify the security policy customization interface to       │
│ include a recommendation for the additional sets of         │
│ security operations                                         │
│                          550                                │
└─────────────────────────────────────────────────────────────┘
```

FIG. 5

SECURITY OPERATION SELECTION USING MACHINE-LEARNED MODEL IN DOCUMENT MANAGEMENT SYSTEM

This application is a continuation application of U.S. application Ser. No. 17/246,529, filed 30 Apr. 2021, the entire contents of which is incorporated herein by reference.

TECHNICAL FIELD

The disclosure generally relates to an online document system, and more specifically to selecting sets of security operations to improve security of online documents created or executed within the online document system.

BACKGROUND

An online document system can enable supplier entities to send electronic requests to signing entities to complete requirements associated with online documents. Requirements may include signing requirements, security and authentication requirements, information collection requirements, or other suitable requirements. To prevent fraud, it is important to verify that users that are completing the requirements are the signing entities. Depending on the type of the online document included in the request, the relevant industry standards and regulations, or the preferences of the supplier entities, steps for verifying identities of the signing entities can vary for different requests. Given the variability, determining which security operations to be performed for identity verification and implementing the security operations can be difficult and time consuming for supplier entities. Furthermore, the supplier entities may use services of a plurality of third parties that perform different sets of security operations to satisfy the security requirements. However, it is difficult to integrate the services of the third parties with the electronic requests managed through the online document system, and using multiple applications associated with the plurality of third parties can lead to poor user experiences for the signing entities.

SUMMARY

An online document system described herein allows for supplier entities to select sets of security operations to be performed during online document creation or online document execution processes to customize identity verification or other security mechanisms within an online document system. The online document system presents a security policy customization interface to a supplier entity that allows the supplier entity to select one or more sets of security operations to be performed in relation to a given online document. As the supplier entity adds or removes sets of security operations, the online document system evaluates an aggregate measure of security of the selected sets of security operations. If the aggregate measure is greater than a threshold measure and the supplier entity confirms the selection, the online document system integrates the selected sets of security operations with an account of the supplier entity in the online document system. If the measure of security is less than a threshold measure, the online document system applies a machine-learned model to recommend additional sets of security operations for the user to add to satisfy the threshold measure. The online document system presents the recommendation of the additional sets of security operations to the supplier entity.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of a system environment in which an online document system operates, in accordance with an embodiment.

FIG. 5 is a flowchart illustrating a process for selecting security operations in an online document system, in accordance with an embodiment.

The figures depict various example embodiments of the present technology for purposes of illustration only. One skilled in the art will readily recognize from the following description that other alternative embodiments of the structures and methods illustrated herein may be employed without departing from principles of the technology described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
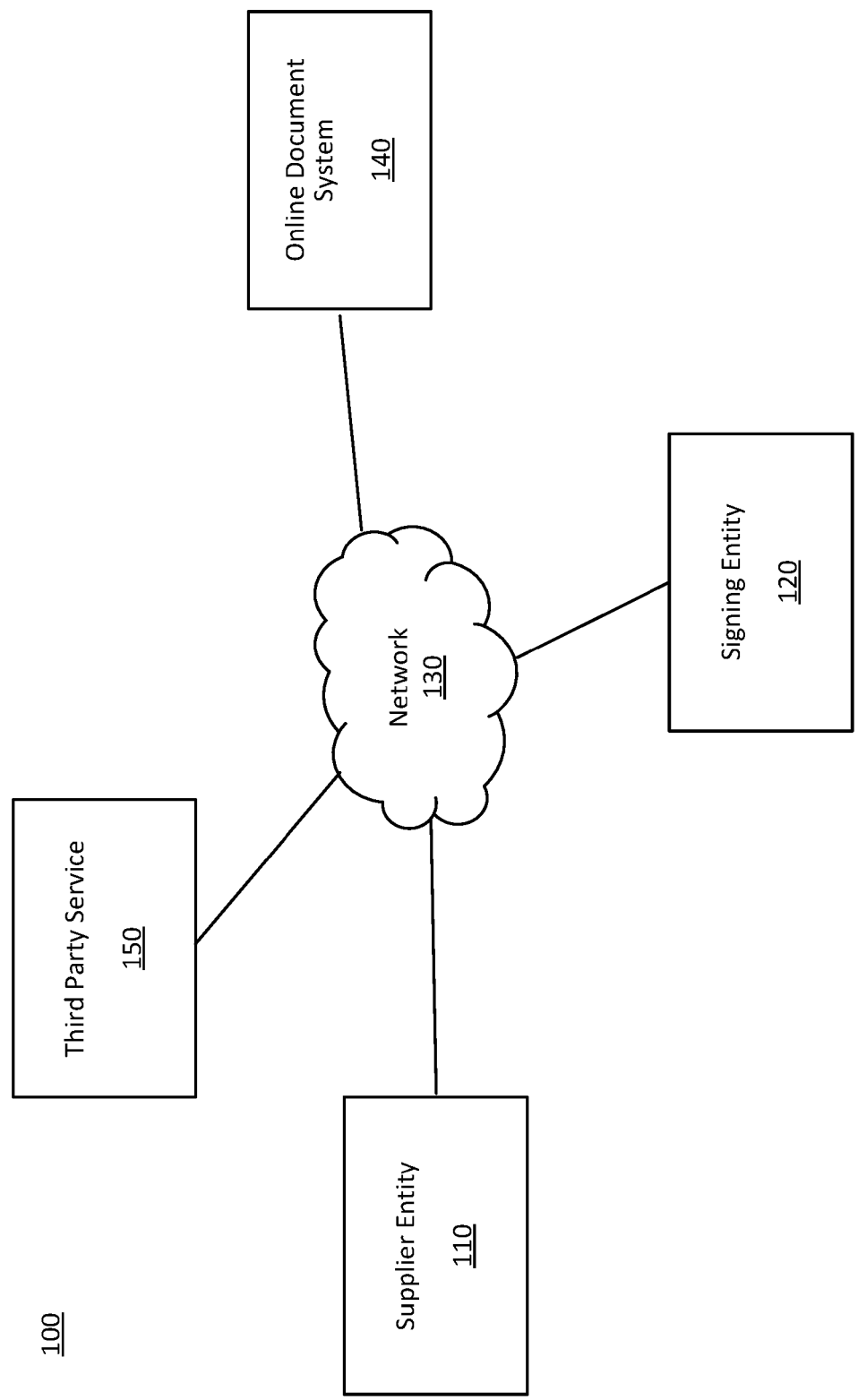

FIG. 1 is a block diagram of a system environment 100 in which an online document system 140 operates, in accordance with an embodiment. The system environment 100 illustrated in FIG. 1 includes a supplier entity 110, a signing entity 120, a network 130, an online document system 140, and one or more third party services 150. The system environment 100 may have alternative configurations than shown in FIG. 1, including for example, different, fewer, or additional components.

The system environment 100 described herein can be implemented within an online document system, a document execution system, or any type of electronic transaction management platform. It should be noted that although description may be limited in certain context to a particular environment, this is for the purposes of simplicity only, and in practice the principles described herein can apply more broadly to the context of any electronic transaction management platform. Examples can include but are not limited to online signature systems, online workflow management systems, online document management systems, multi-party communication and interaction platforms, social networking systems, marketplace and financial transaction management systems, or any suitable electronic transaction management platform.

The supplier entity 110 initiates a request associated with an online document to be completed by the signing entity 120. The supplier entity 110 may be an individual, an organization, a company, an account, and the like. The supplier entity 110 may be an administrator of the online document, which may be a person who created the online document and/or who has authority to administer the online document by changing contents of the online document, grant or deny rights to access the online document, place restrictions on, select tasks to be performed to complete the request with respect to the online document, or send the online document to one or more signing entities 120. The supplier entity 110 may use features of the online document system 140 to communicate the requests or to otherwise coordinate online document activities with the signing entities 120.

A request associated with an online document may include one or more requirements to be completed by the signing entity 120 by performing tasks such as signing the online document, opening the online document, reviewing contents of the online document, editing the contents of the online document, forwarding the online document to another user, providing attachments, completing input fields of the online document, or other interactions with the online document. The tasks may be specified by the supplier entity 110 by configuring fields to be completed by the signing entity 120 within the online document. For example, the supplier entity 110 may add signature blocks, input fields for textual input, and input field for receiving attachments (e.g., images, spreadsheets, documents) in the online document to be filled in by the signing entity 120.

In some embodiments, the online document included in the request may be associated with a document type. The document type may be associated with one or more sets of security operations selected by the supplier entity 110 sending the online document of the document type. When the online document is sent to the signing entity 120 via the online document system 140, the online document system 140 uses the one or more sets of security operations to verify the identity of the signing entity 120. The one or more sets of security operations are provided by the third party services 150.

The signing entity 120 receives a request from a supplier entity 110 to complete one or more requirements associated with an online document in the request. The signing entity 120 may be any entity that receives, reviews, executes, or performs other tasks with respect to an online document. The signing entity 120 may be an individual, an organization, a company, an account, and the like.

The supplier entity 110 and the signing entity 120 may communicate via client devices that are capable of receiving user input as well as transmitting and/or receiving data via the network 130. A client device may refer to a conventional computer system, such as a desktop or a laptop computer. Alternatively, the client device may be a device having computer functionality, such as a personal digital assistant (PDA), a mobile telephone, a smartphone, or another suitable device. The client device is configured to communicate with the online document system 140 and the third party service 150 via the network 130, for example using a native application executed by the computing device and provides functionality of the online document system 140, or through an application programming interface (API) running on a native operating system of the computing device, such as IOS® or ANDROID™. A typical client device include the hardware and software needed to input and output sound (e.g., speakers and microphone) and images, connect to the network 130 (e.g., via Wifi and/or 4G or other wireless telecommunication standards), determine the current geographic location of the client devices (e.g., a Global Positioning System (GPS) unit), and/or detect motion of the client devices (e.g., via motion sensors such as accelerometers and gyroscopes).

The online document system 140 provides access to features of the online document system 140 to supplier entities 110 and signing entities 120. For example, the secure document service 130 provides features such as creation, verification, rights management, storage, circulation, action management, and other functionalities associated with online documents. Further details of secure document service 130 are discussed below with respect to FIG. 2.

Each third party service 150 is configured to provide security operation services to the supplier entity 110 through the online document system 140. A third party service 150 may be associated with an application for performing one or more security operation services that are integrated with the online document system 140 using application programming interface (API). In some embodiments, a third party service 150 can include a software provider configured to provide one or more security modules within a security marketplace. For instance, companies that generate security modules for the use of the companies can offer these security modules to other entities. Each third party service 150 may provide identity verification services such criminal background check, civil background check, driver and motor vehicle screening, drug screening, health screening, international background check, employment verification, education verification, license verification, address verification, identity verification, biometric verification, sanctions list search, government watch list search, IP address check, and bank identification. third party services 150 are associated with a computing device (e.g., a server, a cloud computer) to communicate with one or more of the client device associated with the supplier entity 110 and/or the signing entity 120 and the online document system 140.

The supplier entity 110, the signing entity 120, the online document system 140, and the third party services 150 are configured to communicate via the network 130, which may comprise combination of local area and/or wide area networks, using wired and/or wireless communication systems. In one embodiment, the network 130 uses standard communications technologies and/or protocols. For example, the network 130 includes communication links using technologies such as Ethernet, 802.11, 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

Online Document System

Figure 2:
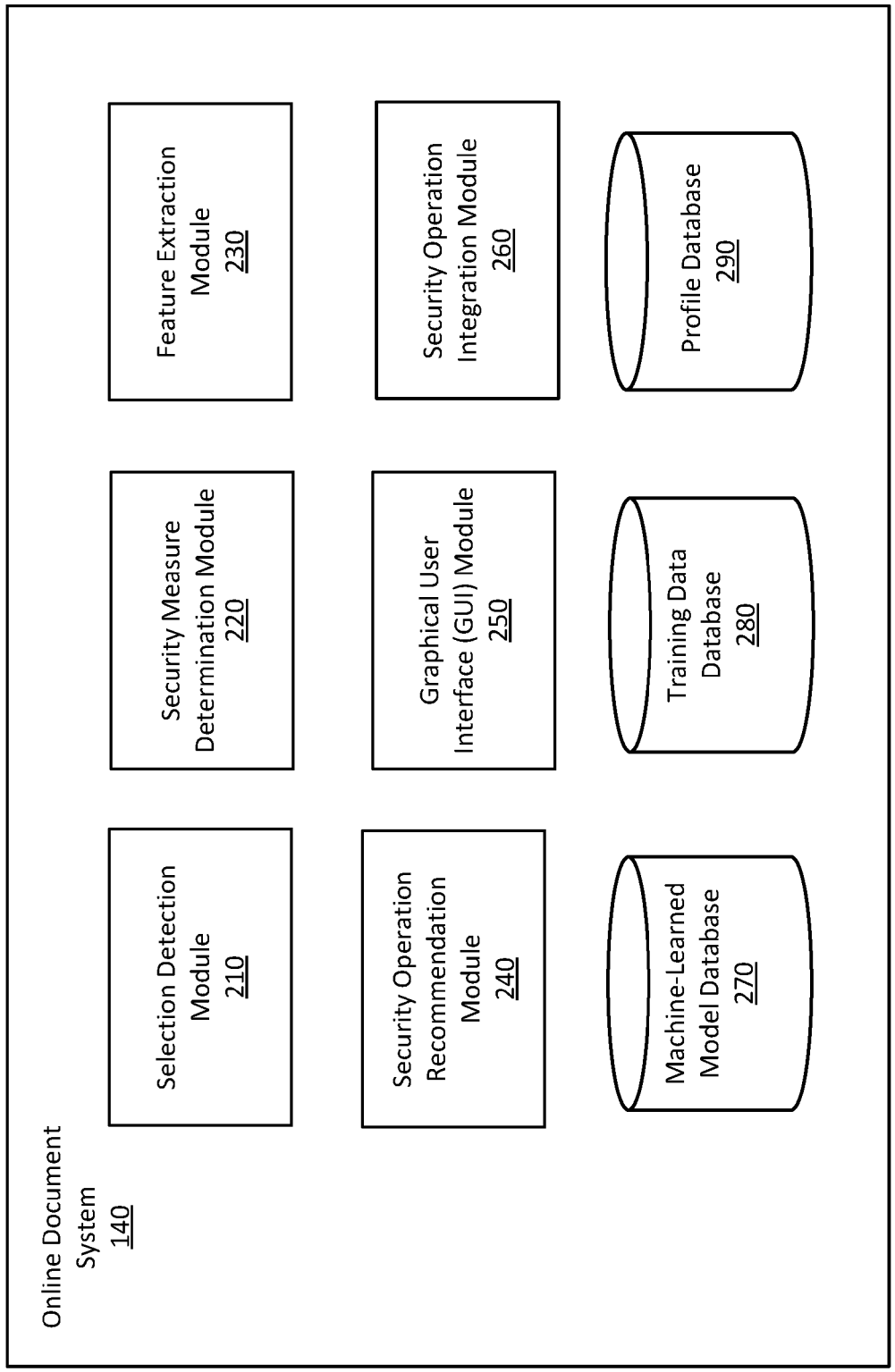
FIG. 2 is a block diagram of an online document system, in accordance with an embodiment.

FIG. 2 is a block diagram of an online document system 140, in accordance with an embodiment. The online document system 140 includes a selection detection module 210, a security measure determination module 220, a feature extraction module 230, a security operation recommendation module 240, a graphical user interface (GUI) module, a security operation integration module 260, a machine-learned model database 270, a training data database 280, and a profile database 290. The modules and databases illustrated in FIG. 2 are merely exemplary, and other embodiments of the online document system 140 may include additional, fewer, and/or different components.

The GUI module 250 generates a security policy customization interface for presenting available sets of security operations to a supplier entity 110. The security policy customization interface allows the supplier entity 110 to add or remove sets of security operations from the available sets of security operations to be used to improve security of online documents. The GUI module 250 may present the security policy customization interface when the supplier entity 110 creates an online document, before the supplier entity 110 sends the online document to a signing entity 120, when the supplier entity 110 creates a workflow, or during other stages of document creation or execution process. The online document system 140 determines an aggregate measure of security based on sets of security operations selected by the supplier entity 110, and if the aggregate measure of security is less than a threshold measure of security, the online document system 140 provides a recommendation of additional sets of security operations to the supplier entity 110 to satisfy the threshold measure of security. The recommendation is presented on the security policy customization interface. An example security policy customization interface is described with respect to FIG. 4.

The selection detection module 210 detects when a supplier entity 110 has selected one or more sets of security operations within the security policy customization interface. When the selection detection module 210 detects that the supplier entity 110 has interacted with an element in the security policy customization interface to add or remove one or more sets of security operations, the selection detection module 210 sends a signal to the security measure determination module 220 to indicate that the supplier entity 110 has selected the one or more sets of security operations and identifies the one or more selected sets of security operations.

The security measure determination module 220 determines an aggregate measure of security associated with sets of security operations selected by the supplier entity 110. Each set of security operations may be associated with a predetermined measure of security, and the security measure determination module 220 determines the aggregate measure of security by combining the measures of security associated with the selected sets of security operations. The aggregate measure of security may be a weighted sum of the measures of security associated with the selected sets of security operations, where a weight associated with a set of security operations depends on types and complexity of security actions performed. When two or more sets of security operations include overlapping security operations, the weights of the two or more sets of security operations may be modified to reduce the aggregate measure of security since the overlapping security operations are redundant and do not improve security. In some embodiments, when determined that there are two or more sets of security operations with overlapping security operations, a recommendation may be generated in the security policy customization interface to remove a set from the two or more sets of security operations.

After determining the aggregate measure of security, the security measure determination module 220 compares the aggregate measure of security to a threshold measure of security. In some embodiments, the threshold measure of security may be based on the preference of the supplier entity 110. The security policy customization interface may include an option for the supplier entity 110 to indicate the desired security strength level along with the sets of security operations. For example, the supplier entity 110 may select an option from different security strength levels such as "weak," "fair," "strong," that are each associated with a different threshold measure of security. The security policy customization interface may include an option for the supplier entity 110 to select one or more security standards (e.g., NIST, KYC, AML/CFT standards). Based on the selected security standards, the security measure determination module 220 may determine the threshold measure of security for the aggregate measure of security to be compared to.

In some embodiments, the threshold measure of security may be determined by the security measure determination module 220 based on features of the supplier entity 110, the signing entity 120, and/or the online documents. The supplier entity 110 may not provide a preference for security strength or security standards, and the security measure determination module 220 may determine the threshold measure of security based on selections of historical users that are similar to the supplier entity 110, previous selections by the supplier entity 110, or other features of the supplier entity 110, the signing entity 120, and/or the online documents.

The security measure determination module 220 may determine an updated aggregate measure of security as the supplier entity 110 modifies the selected sets of security operations. When the aggregate measure of security is greater than the threshold measure of security, the online document system 140 notifies the supplier entity 110 that the selected sets of security operations satisfy the threshold measure of security. For example, the security policy customization interface is modified to include a message or another visual element to indicate that the threshold measure of security has been satisfied and request confirmation from the supplier entity 110 to implement the selected sets of security operations. After receiving confirmation from the supplier entity 110 of the selected sets of security operations, the security measure determination module 220 sends a signal to the security operation integration module 260 to initiate provisioning the selected sets of security operations to one or more accounts associated with the supplier entity 110.

When the aggregate measure of security is less than the threshold measure of security, the security measure determination module 220 sends a signal to the feature extraction module 230. The feature extraction module 230 extracts features associated with the supplier entity 110, the signing entity 120, and/or online documents. The feature extraction module 230 may access profiles associated with the supplier entity 110 and/or the signing entity 120 in the profile database 290 and use information stored in the profiles to extract the features. The features may include user characteristics in the profiles, previous activity within the online document system 140, and other information associated with the supplier entity 110 and/or the signing entity 120. The profile database 290 includes profile data of users, and the profile data may include data input by the users (e.g., demographic and biographical information), data associated with users that was not input by the users (e.g., attributes determined by the online document system 140), activity history of users such as previous online document requests sent or received by the user, and previously selected preferences (e.g., sets of security operations previously selected). The features extraction module 230 may identify a document type associated with an online document. The feature extraction module 230 may use text analysis of the online documents to identify the document type. For example, the feature extraction module 230 may extract features based on clauses identified in the online documents. The extracted features are provided to the security operation recommendation module 240.

The security operation recommendation module 240 recommends additional sets of security operations to the supplier entity 110 to satisfy the threshold measure of security. When the aggregate measure of security is less than the threshold measure of security, the security operation recommendation module 240 applies one or more machine-learned models to identify one or more additional sets of security operations to recommend to the signing entity 110 such that the aggregate measure of security is greater than the threshold measure of security. The one or more machine learning models may include a neural network, decision tree, or other type of computer model, and any combination thereof. The machine-learned models may be trained to recommend the one or more additional sets of security operations using training data from the training data database 280 based on what similar historical users have previously selected, based on subject matter associated with the supplier entities 120, signing entities 120, and/or online documents, user feedback, and other relevant information. The training data may include features of historical users (e.g., other supplier entities 110 and/or signing entities 120), sets of security operations previously selected by historical users, previous recommendations made by the online document system 140, and the like. Training a machine-learned model based on the training data can include identifying correlations between training data features (e.g., user features, document features, etc.) and security operations selected by entities associated with the training data features. As such, the machine-learned models are configured to receive one or more features of supplier entities 110, signing entities 120, and/or online documents and output one or more sets of security operations to recommend. The machine-learning models may receive the aggregate security measure and the sets of security operations that are currently selected as input and recommend sets of security operations that, when added to the currently selected sets of security operations, exceed the threshold measure.

In some embodiments, the security operation recommendation module 240 may offer recommendations even if the aggregate measure of security is greater than the threshold measure. The security operation recommendation module 240 may provide recommendations to replace or add a set of security operations. For example, a supplier entity 110 may select 5 sets of security operations that satisfy the threshold measure. However, the security operation recommendation module 240 may identify a different combination including 3 sets of security operations that also satisfy the threshold measure. The security operation recommendation module 240 may recommend the 3 sets of security operations to the supplier entity 110 since the reduced number of sets can involve fewer steps and improve user experience of the signing entity 120. In another example, the security operation recommendation module 240 may recommend that the supplier entity 110 add a particular set of security operations if a proportion of other users similar to the supplier entity 110 that selected the set of security operations is greater than a threshold. The recommendation may indicate that although the threshold measure of security has been satisfied, the set of security operations is being recommended since other similar users decided to include it.

The recommended sets of security operations are presented in the security policy customization interface. After presenting the recommendation, if the supplier entity 110 selects the recommended sets of security operations, the security measure determination module 220 verifies that the aggregate measure of security is greater than the threshold and requests confirmation from the supplier entity 110. After receiving confirmation from the supplier entity 110 of the selected sets of security operations, the security measure determination module 220 sends a signal to the security operation integration module 260 to initiate provisioning the selected sets of security operations to one or more accounts associated with the supplier entity 110.

The security operation integration module 260 provisions the selected sets of security operations to be used by the supplier entity 110 within the online document system 140. The security operation integration module 260 may communicate with APIs of third party services 150 providing the selected sets of security operations. The security operation integration module 260 may combine the selected sets of security operations in a security workflow that includes performing the selected sets of security operations when a triggering condition (e.g., when a signing entity 120 accesses an online document, when a signing entity 120 signs an online document) is satisfied.

Example Flow of Security Operation Selection

Figure 3:
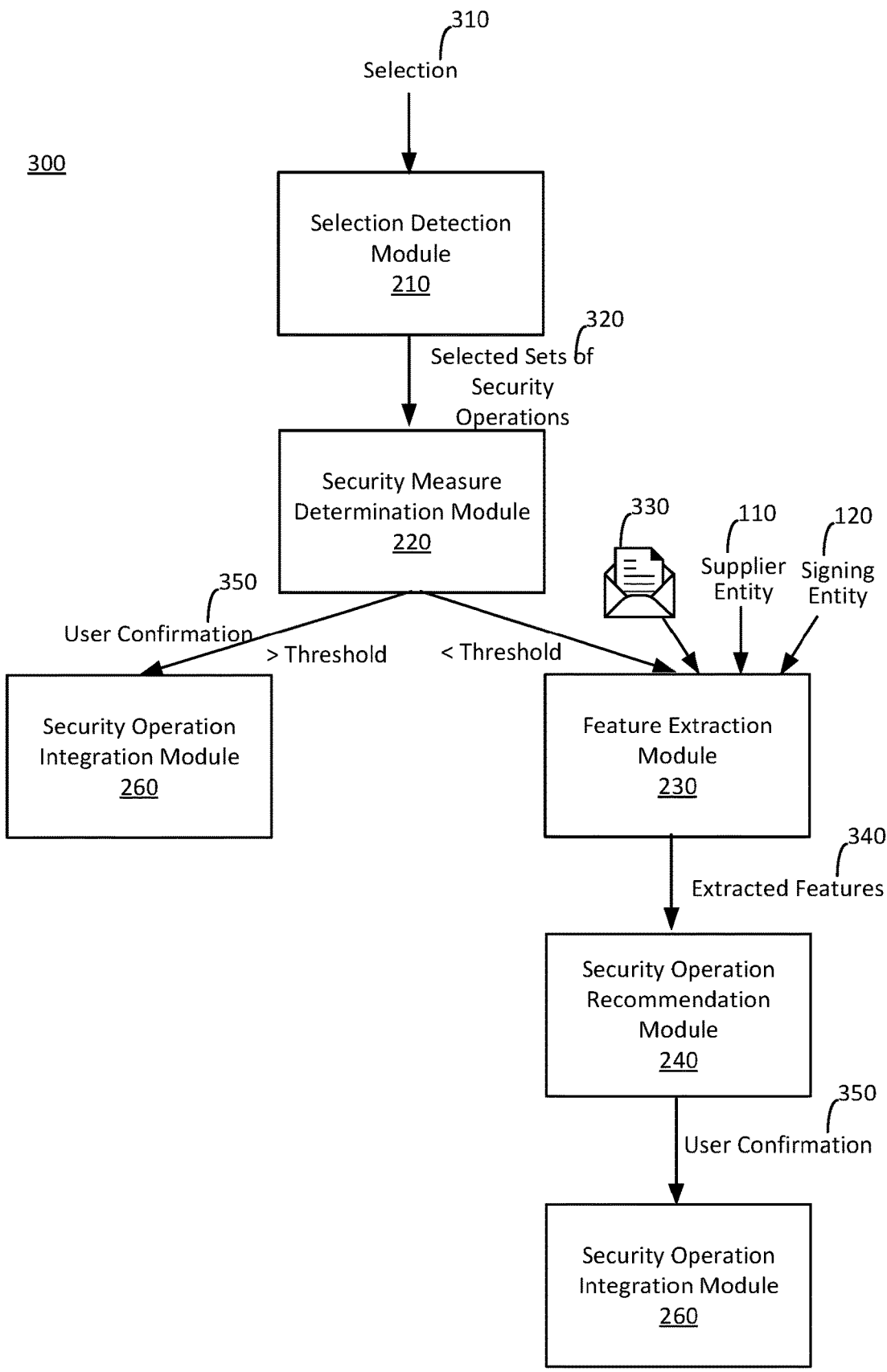
FIG. 3 illustrates a process of selecting security operations, in accordance with an embodiment.

FIG. 3 illustrates a process 300 of selecting security operations, in accordance with an embodiment. When a supplier entity 110 makes a selection 310 to indicate one or more sets of security operations to be performed, the selection detection module 210 detects the selection and provides information associated with selected security operations 320 to the security measure determination module 220. The security measure determination module 220 determines an aggregate measure of security of the selected sets of security operations 320. Each set of security operation is associated with a measure of security, and the aggregate measure is determined by combining the measures of security of the selected sets of security operations. As the supplier entity 110 selects or unselects a set of security operations, the security measure determination module 220 updates the aggregate measure accordingly.

When the security measure determination module 220 determines the aggregate measure of security, the security measure determination module 220 compares the aggregate measure to a threshold measure of security. When the aggregate measure of security is greater than the threshold measure of security, the security measure determination module 220 notifies the supplier entity 110 that the selected sets of security operations are sufficient to satisfy the threshold measure of security and requests that the supplier entity 110 confirm the selection. After receiving a confirmation 350 of the final sets of security operations, the security measure determination module 220 sends a signal to the security operation integration module 260 to start adding the selected sets of security operations to the supplier entity's user account within the online document system 140.

When the aggregate measure of security is lower than the threshold measure of security, the security measure determination module 220 sends a signal to the feature extraction module 230 that extracts features associated with online documents 330, the supplier entity 110, and/or the signing entity 120. The extracted features 340 are provided to the security operation recommendation module 240 that applies a machine-learned model to identify one or more additional sets of security operations to recommend to the supplier entity 110. As the supplier entity 110 adds or removes a set of security operations, if the security measure determination module 220 determines that the updated aggregate measure of security is less than the threshold, the security operation recommendation module 240 also updates one or more additional sets of security operations to recommend. The one or more additional sets of recommended security operations are presented to the supplier entity 110. If the supplier entity 110 selects the one or more additional sets of recommended security operations that cause the aggregate measure of security to be greater than the threshold measure and the user confirms 350 the selection, the security operation recommendation module 240 causes the security operation integration module 260 to add the selected sets of security operations to the supplier entity's user account within the online document system 140.

Example Graphical User Interface

Figure 4:
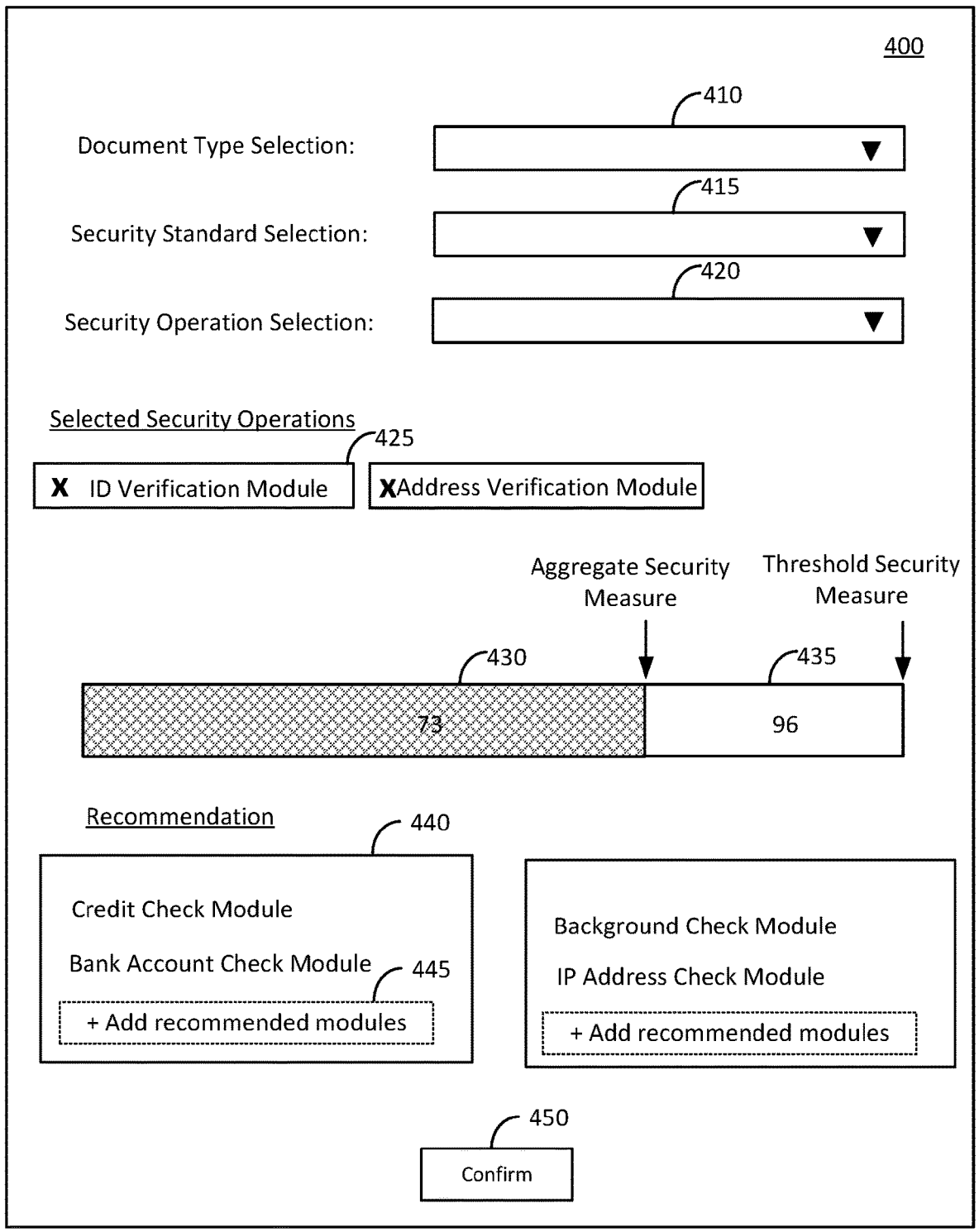
FIG. 4 illustrates an example graphical user interface (GUI) of an online document system for selecting security operations, in accordance with an embodiment.

FIG. 4 illustrates an example graphical user interface (GUI) of an online document system for selecting security operations, in accordance with an embodiment. The GUI may be a security policy customization interface 400 (also referred to herein as "interface") configured to receive input from a supplier entity 110 and present recommended sets of security operations to the supplier entity 110. The interface 400 is merely exemplary, and other embodiments may include different visual elements.

The interface 400 includes a document type input field 410 and a security standard input field 415 configured to receive input from the supplier entity 110. The supplier entity 110 may interact with the input fields to indicate the document type of the online document associated with a request. For example, the document type input field 410 and the security standard input field 415 may be dropdown menus that include a list of possible document types and a list of possible security standard types, respectively. Based on the input from the supplier entity 110, a list of possible sets of security operations for the security operation input field 420 may be filtered. The security operation input field 420 may present a dropdown menu with sets of security operations associated with the input. The supplier entity 110 may interact with the security operation input field 420 to select one or more of the sets of security operations 425 to be used when processing the request including the online document.

As the supplier entity 110 adds or removes sets of security operations, the online document system 140 determines and presents an aggregate security measure 430 associated with the selected sets of security operations. In the example illustrated in FIG. 4, "ID Verification Module" and "Address Verification Module" are selected, and these selected sets of security operations are associated with an aggregate security measure 430 having a value of "73." The aggregate security measure 430 is presented with respect to a threshold security measure 435 having a value of 96.

When the aggregate security measure 430 is less than the threshold security measure, the online document system 140 identifies one or more sets of security operations to recommend such that the aggregate security measure 430 is greater than the threshold security measure 435. The recommended sets of security operations 440 may be presented to the supplier entity 110 along with a graphical element 445 that allows the supplier entity 110 to add the recommended sets of security operations 440. When the aggregate security measure 430 of the selected sets of security operations is greater than the threshold security measure 435 and responsive to receiving confirmation from the supplier entity 110 via the confirmation button 450, the online document system 140 initiates provisioning the selected sets of security operations in the account associated with the supplier entity 110.

Process of Managing Actions

FIG. 5 is a flowchart illustrating a process for selecting security operations in an online document system, in accordance with an embodiment. The online document system presents 510 a plurality of sets of security operations within a security policy customization interface to a user. Each set of security operations is associated with a measure of security and comprises one or more security operations that improve security within a document creation or execution process. The online document system receives 520 a selection of sets of security operations via the security policy customization interface from the user. The online document system computes 530 an aggregate measure of security based on the measures of security associated with the selected sets of security operations. In response to the aggregate measure of security being less than a threshold measure of security, the online document system applies 540 a machine-learned model to characteristics of the user to identify additional sets of security operations to recommend. The online document system modifies 550 the security policy customization interface to include a recommendation for the additional sets of security operations.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computer system referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   determining, by a computer system, an aggregate measure of security for one or more sets of security operations, each set of the one or more sets of security operations comprising one or more security operations that, when performed, improve security within a document process;
   based on the aggregate measure of security and a threshold measure of security, applying, by the computer system, a machine-learned model to identify one or more additional sets of security operations, the one or more additional sets of security operations, when combined with the one or more sets of security operations, resulting in an updated aggregate measure of security that satisfies the threshold measure of security; and
   modifying, by the computer system, the one or more sets of security operations based on the one or more additional sets of security operations.

2. The method of claim 1, further comprising:
   causing, by the computer system, a presentation of a user interface to present a recommendation for the one or more additional sets of security operations,
   wherein the modifying is in response to receiving a confirmation associated with the recommendation.

3. The method of claim 1, wherein applying the machine-learned model is in response to determining that the aggregate measure of security is less than the threshold measure of security.

4. The method of claim 3, wherein the modifying comprises adding the one or more additional sets of security operations to the one or more sets of security operations.

5. The method of claim 1, wherein applying the machine-learned model is in response to determining that the aggregate measure of security is greater than the threshold measure of security.

6. The method of claim 5,
   wherein to identify the one or more additional sets of security operations, the machine-learned model is configured to identify at least one security operation of the one or more security operations to be replaced by the one or more additional sets of security operations; and
   wherein the modifying comprises removing the at least one security operation from the one or more sets of security operations and adding the one or more additional sets of security operations to the one or more sets of security operations.

7. The method of claim 1, further comprising:
   determining, by the computer system, a selection of a security standard from a user, the security standard associated with a minimum measure of security; and
   updating, by the computer system, the threshold measure of security based on the minimum measure of security.

8. The method of claim 1, wherein the one or more sets of security operations comprise at least a first set and a second set and wherein determining the aggregate measure of security comprises reducing the aggregate measure of security responsive to determining that the first set and the second set include overlapping security operations.

9. The method of claim 1, wherein the machine-learned model is trained using a training data set including features of historical users and sets of historical security operations selected by the historical users.

10. The method of claim 9, wherein the training data set further includes features of one or more of a document created or executed by a historical user of the historical users.

11. The method of claim 1, wherein the machine-learned model is configured to minimize a number of sets in the one or more additional sets of security operations.

12. A system comprising:
    one or more processors; and
    non-transitory computer-readable storage media comprising instructions that, when executed, cause the one or more processors to:
    determine an aggregate measure of security for one or more sets of security operations, each set of the one or more sets of security operations comprising one or more security operations that, when performed, improve security within a document process;
    based on the aggregate measure of security and a threshold measure of security, apply a machine-learned model to identify one or more additional sets of security operations, the one or more additional sets of security operations, when combined with the one or more sets of security operations, resulting in an updated aggregate measure of security that satisfies the threshold measure of security; and
    modify the one or more sets of security operations based on the one or more additional sets of security operations.

13. The system of claim 12,
    wherein the instructions further cause the one or more processors to cause a presentation of a user interface to present a recommendation for the one or more additional sets of security operations; and
    wherein the instructions cause the one or more processors to modify the one or more sets of security operations in response to receiving a confirmation associated with the recommendation.

14. The system of claim 12, wherein the instructions cause the one or more processors to apply the machine-learned model in response to a determination that the aggregate measure of security is less than the threshold measure of security.

15. The system of claim 14, wherein the instructions to modify the one or more sets of security operations cause the one or more processors to add the one or more additional sets of security operations to the one or more sets of security operations.

16. The system of claim 12, wherein the instructions cause the one or more processors to apply the machine-learned model in response to a determination that the aggregate measure of security is greater than the threshold measure of security.

17. The system of claim 16,
wherein to identify one or more additional sets of security operations, the machine-learned model is configured to identify at least one security operation of the one or more security operations to be replaced by the one or more additional sets of security operations; and
wherein the instructions to modify the one or more sets of security operations cause the one or more processors remove the at least one security operation from the one or more sets of security operations and add the one or more additional sets of security operations to the one or more sets of security operations.

18. The system of claim 12, wherein the instructions cause the one or more processors to:
determine a selection of a security standard from a user, the security standard associated with a minimum measure of security; and
update the threshold measure of security based on the minimum measure of security.

19. The system of claim 12, wherein the one or more sets of security operations comprise at least a first set and a second set and wherein the instructions to determine the aggregate measure of security cause the one or more processors to reduce the aggregate measure of security responsive to a determination that the first set and the second set include overlapping security operations.

20. Non-transitory computer-readable storage media comprising instructions that, when executed, cause one or more processors to:
determine an aggregate measure of security for one or more sets of security operations, each set of the one or more sets of security operations comprising one or more security operations that, when performed, improve security within a document process;
based on the aggregate measure of security and a threshold measure of security, apply a machine-learned model to identify one or more additional sets of security operations, the one or more additional sets of security operations, when combined with the one or more sets of security operations, resulting in an updated aggregate measure of security that satisfies the threshold measure of security; and
modify the one or more sets of security operations based on the one or more additional sets of security operations.

* * * * *